US010113502B2

(12) United States Patent
Maki et al.

(10) Patent No.: US 10,113,502 B2
(45) Date of Patent: Oct. 30, 2018

(54) CYLINDER HEAD FOR AN INTERNAL COMBUSTION ENGINE

(71) Applicant: Ford Global Technologies, LLC, Dearborn, MI (US)

(72) Inventors: Clifford E. Maki, New Hudson, MI (US); Antony George Schepak, Howell, MI (US); Mathew Leonard Hintzen, Stockbridge, MI (US); Mark W. Thibault, Canton, MI (US); Christopher Donald Wicks, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 274 days.

(21) Appl. No.: 14/847,345

(22) Filed: Sep. 8, 2015

(65) Prior Publication Data

US 2017/0067413 A1 Mar. 9, 2017

(51) Int. Cl.
*F02F 1/42* (2006.01)
*B23K 11/00* (2006.01)
(Continued)

(52) U.S. Cl.
CPC .................. *F02F 1/38* (2013.01); *B22C 7/02* (2013.01); *B22C 9/108* (2013.01); *B22C 9/24* (2013.01);
(Continued)

(58) Field of Classification Search
CPC .... F02F 1/38; F02F 1/4285; F02F 1/18; F02F 7/0085; B22C 9/108; B22C 9/24;
(Continued)

(56) References Cited

U.S. PATENT DOCUMENTS 2,049,205 A 7/1936 Jardine
4,774,912 A 10/1988 Nakano et al.
(Continued)

OTHER PUBLICATIONS

Terry J. Anderson, Fiber Reinforced Ceramic Matrix Composite Cylinder Head and Cylinder Head Liner for an Internal Combustion Engine, Feb. 27, 1997, Northrop Grumman, WO97/07328.*
(Continued)

*Primary Examiner* — Syed O Hasan
(74) *Attorney, Agent, or Firm* — Brooks Kushman P.C.; Julia Voutyras

(57) ABSTRACT

A cylinder head includes an inner structural member having a plate forming a deck face of the cylinder head and forming at least one dished cylinder roof, and a plurality of cylinder head bolt columns extending from the plate. An outer member is supported by the inner structural member and forms a cooling jacket, intake ports, and exhaust ports. Passages of the cooling jacket are lined with metal walls in contact with the composite structure of the outer member. A method of forming a cylinder head includes positioning a structural insert and a lost core insert in a tool, and injecting material into the tool to form a body surrounding the structural insert and the lost core insert thereby forming a head preform. The lost core insert is shaped to form a cooling jacket and has a lost core material generally encapsulated in a metal shell.

12 Claims, 5 Drawing Sheets

(51) Int. Cl.

| | |
|---|---|
| ***F02F 1/38*** | (2006.01) |
| ***B22C 7/02*** | (2006.01) |
| ***B22C 9/10*** | (2006.01) |
| ***B22C 9/24*** | (2006.01) |
| ***B22D 17/00*** | (2006.01) |
| ***B22D 21/00*** | (2006.01) |
| ***B22D 25/02*** | (2006.01) |
| ***B22D 19/00*** | (2006.01) |
| ***B22D 21/04*** | (2006.01) |
| ***F02F 7/00*** | (2006.01) |

(52) U.S. Cl.

CPC ......... *B22D 17/00* (2013.01); *B22D 19/0009* (2013.01); *B22D 21/007* (2013.01); *B22D 21/04* (2013.01); *B22D 25/02* (2013.01); *F02F 1/4285* (2013.01); *F02F 7/0085* (2013.01); *F05C 2253/04* (2013.01)

(58) Field of Classification Search

CPC ........ B22C 7/02; B22D 17/00; B22D 21/007; B22D 25/02; B22D 19/0009; B22D 21/04; B29C 45/0001; B29C 45/0005

USPC ..................................... 123/193.5; 29/888.06

See application file for complete search history.

(56) References Cited

U.S. PATENT DOCUMENTS

| | | | | |
|---|---|---|---|---|
| 5,845,616 | A * | 12/1998 | Schwarzenthal | F01M 9/104 123/193.5 |
| 6,478,073 | B1 | 11/2002 | Grebe et al. | |
| 6,479,165 | B2 | 11/2002 | Fischer et al. | |
| 2008/0184956 | A1 * | 8/2008 | Inui | F01L 1/022 123/193.5 |
| 2013/0025560 | A1 * | 1/2013 | Thomas | F02F 1/24 123/193.5 |

OTHER PUBLICATIONS

Pierri, "Lost Core, New Perspectives in Die Casting", Bühler AG, 2012, 20 pages.

Heppes, "Stable Filled Aluminum Tubes for Foundries Near End Outline Casting With Remarkable Material Savings", Drahtzug Stein combicore, 27 pages.

* cited by examiner

CYLINDER HEAD FOR AN INTERNAL COMBUSTION ENGINE

TECHNICAL FIELD

Various embodiments relate to a composite cylinder head for an internal combustion engine.

BACKGROUND

During engine operation, a cylinder head may require cooling, and a fluid jacket system containing a coolant such as water may be provided. Various regions of the cylinder head may be stressed areas with little packaging space. The head may be formed using processes including casting and molding in a tool. The head may have various features such as complex shapes and fluid passages for a cooling jacket, lubrication system, and the like. Providing these complex shapes and passages may be challenging. For example, a sand core or other lost core may be used in a low pressure process to provide the desired features; however, limitations may arise due to small dimensions, of the desired feature on packaging limitations, the core material being unable to withstand a high pressure process, the core material being crushed, the core material shifting during the process, and the resulting cylinder head losing desired features or being otherwise incomplete. Additionally, for a cylinder head formed from a composite material, cooling passages machined or directly molded into the composite material may provide insufficient thermal management and cooling for the head during engine operation.

SUMMARY

According to an embodiment, a cylinder head for an internal combustion engine is provided. An inner structural metal member has a first plate forming a deck face of the cylinder head and forming a series of dished cylinder roofs. The inner member has cylinder head bolt columns extending from the first plate, exhaust valve guides connected to the first plate by first support arms, intake valve guides connected to the first plate by second support arms, and a second plate configured for mounting an exhaust manifold and extending at an angle to the first plate. An outer composite member is supported by the inner member and forms a body of the cylinder head including an intake side wall, first and second end wall, and a top wall opposed to the deck face. The outer member defines a cooling jacket, intake ports, and exhaust ports. Fluid passages of the cooling jacket are formed by metal walls in contact with and surrounded by the composite material of the outer member.

According to another embodiment, a cylinder head is provided with an inner structural member having a plate forming a deck face of the cylinder head and forming at least one dished cylinder roof, and a plurality of cylinder head bolt columns extending from the plate. An outer member is supported by the inner structural member and forms a cooling jacket, intake ports, and exhaust ports.

According to yet another embodiment, a method of forming a cylinder head for an internal combustion engine is provided. A structural insert and a lost core insert are positioned in a tool. The lost core insert is shaped to form a cooling jacket and has a lost core material generally encapsulated in a metal shell. Material is injected into the tool to form a body surrounding the structural insert and the lost core insert thereby forming a head preform.

Various embodiments of the present disclosure have associated, non-limiting advantages. For example, for a block formed at least in part from a composite material, and thermal gradient hot spots need special heat management as the composite material acts as an insulator due to its low thermal conductivity. A self-contained hollow aluminum core that nests in contact with a high heat source for example the composite cylinder head provides for a fluid jacket with heat management of the head. The coolant is used to extract heat from the engine cylinder head out to the heat exchanger, e.g. a radiator. The fluid flow passage is contained in the hollow aluminum core molded or cast into the surrounding housing such as a composite over-molded cylinder block. The skin of the outer surface of the fluid flow passage is in direct contact with the composite material and/or aluminum alloy die cast holding it. The passage provides a heat flux conduit that pulls excess heat from such areas requiring dimensional stability, with the outer surface or shell being made from aluminum or an aluminum alloy material, which dissipates and conducts heat efficiently. The cooling jacket insert with an aluminum shell over the salt core provides a structure to protect the salt core from fracturing or otherwise dissolving during the manufacturing process. The resulting coolant circuit or cooling jacket in the head has thin walls and smaller cross sectional passageways. The cooling jacket insert allows for tight positional control, and also control over the physical shape of the fluid passages for optimized heat transfer due to improved flow circuit configurations that are otherwise unavailable with conventional sand cores or high pressure casting or molding tooling limitations. The thin cross sections of the fluid passages allow coolant to be placed next to the high heat flux regions like valve seats in the head. A structural insert is used with the head to provide additional strength to the head, for example, when used with a composite material, and results in an engine with reduced weight and increased fuel efficiency.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
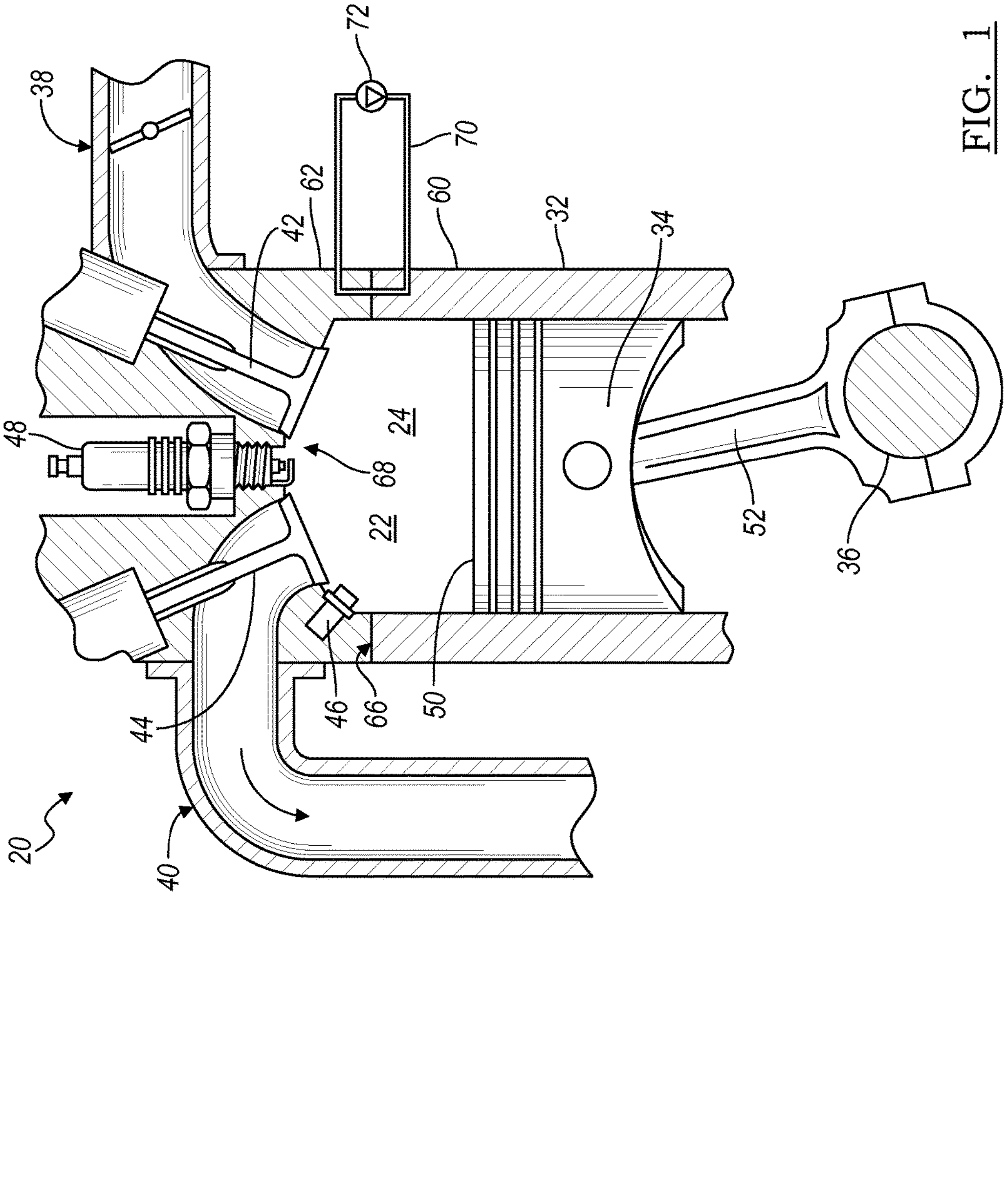
FIG. 1 illustrates a schematic of an internal combustion engine configured to implement the disclosed embodiments.

FIG. 1 illustrates a schematic of an internal combustion engine 20. The engine 20 has a plurality of cylinders 22, and one cylinder is illustrated. The engine 20 may include multiple cylinders arranged in various manners, including an inline configuration and a V-configuration. The engine 20 has a combustion chamber 24 associated with each cylinder 22. The cylinder 22 is formed by cylinder walls 32 and piston assembly 34. The piston assembly 34 is connected to a crankshaft 36. The combustion chamber 24 is in fluid communication with the intake manifold 38 and the exhaust manifold 40. An intake valve 42 controls flow from the intake manifold 38 into the combustion chamber 24. An exhaust valve 44 controls flow from the combustion chamber 24 to the exhaust manifold 40. The intake and exhaust valves 42, 44 may be operated in various ways as is known in the art to control the engine operation.

A fuel injector 46 delivers fuel from a fuel system directly into the combustion chamber 24 such that the engine is a direct injection engine. A low pressure or high pressure fuel injection system may be used with the engine 20, or a port injection system may be used in other examples. An ignition system includes a spark plug 48 that is controlled to provide energy in the form of a spark to ignite a fuel air mixture in the combustion chamber 24. In other embodiments, other fuel delivery systems and ignition systems or techniques may be used, including compression ignition.

The engine 20 includes a controller and various sensors configured to provide signals to the controller for use in controlling the air and fuel delivery to the engine, the ignition timing, the power and torque output from the engine, and the like. Engine sensors may include, but are not limited to, an oxygen sensor in the exhaust manifold 40, an engine coolant temperature, an accelerator pedal position sensor, an engine manifold pressure (MAP) sensor, an engine position sensor for crankshaft position, an air mass sensor in the intake manifold 38, a throttle position sensor, and the like.

In some embodiments, the engine 20 is used as the sole prime mover in a vehicle, such as a conventional vehicle, or a stop-start vehicle. In other embodiments, the engine may be used in a hybrid vehicle where an additional prime mover, such as an electric machine, is available to provide additional power to propel the vehicle.

Each cylinder 22 operates under a four-stroke cycle including an intake stroke, a compression stroke, an ignition stroke, and an exhaust stroke. In other examples, the engine may operate using a two-stroke cycle. During the intake stroke, the intake valve 42 opens and the exhaust valve 44 closes while the piston assembly 34 moves from the top of the cylinder 22 to the bottom of the cylinder 22 to introduce air from the intake manifold to the combustion chamber 24. The piston assembly 34 position at the top of the cylinder 22 is generally known as top dead center (TDC). The piston assembly 34 position at the bottom of the cylinder is generally known as bottom dead center (BDC).

During the compression stroke, the intake and exhaust valves 42, 44 are closed. The piston 34 moves from the bottom towards the top of the cylinder 22 to compress the air within the combustion chamber 24.

Fuel is then introduced into the combustion chamber 24 and ignited. In the engine 20 shown, the fuel is injected into the chamber 24 and is then ignited using spark plug 48. In other examples, the fuel may be ignited using compression ignition.

During the expansion stroke, the ignited fuel air mixture in the combustion chamber 24 expands, thereby causing the piston 34 to move from the top of the cylinder 22 to the bottom of the cylinder 22. The movement of the piston assembly 34 causes a corresponding movement in crankshaft 36 and provides for a mechanical torque output from the engine 20. The combustion process causing the expansion stroke results in loads and forces on the engine 20. A force on the engine caused by the combustion event in the chamber 24 imparts a force on the face 50 of the piston 34, and at least a portion of the force travels down the connecting rod 52 to the main bearing and crankshaft 36. This force on the main bearing may be referred to as a reactive force. The combustion event within the chamber 24 also causes a force on the cylinder head 62, which loads attachment points, such as head bolts, between the engine head 62 and a cylinder block 60. The force on the cylinder head and head bolts may be referred to as a combustion force.

During the exhaust stroke, the intake valve 42 remains closed, and the exhaust valve 44 opens. The piston assembly 34 moves from the bottom of the cylinder to the top of the cylinder 22 to remove the exhaust gases and combustion products from the combustion chamber 24 by reducing the volume of the chamber 24. The exhaust gases flow from the combustion chamber 24 and cylinder 22 to the exhaust manifold 40 and to an aftertreatment system such as a catalytic converter.

The intake and exhaust valve 42, 44 positions and timing, as well as the fuel injection timing and ignition timing may be varied for the various engine strokes.

The engine 20 may have a cylinder block 60. A cylinder head 62 is connected to the block 60 and cooperates with the block to form the cylinders 22 and combustion chambers 24. The head 62 encloses the combustion chamber 24 and also supports the various valves 42, 44, and intake and exhaust systems 38, 40. A head gasket or another sealing member may be positioned between the block 60 and the head 62 to seal the combustion chamber 24.

The cylinder head 62 has a deck face 66 that cooperates with a corresponding block deck face and the gasket when the engine 20 is assembled. The head 62 has dished cylinder roofs 68 or other end walls that cooperate with the cylinder walls of the block 60 to form the combustion chambers 24. The cylinder roofs 68 are concave, and may have various shapes including bean shaped, pyramid shaped, hemispherical, angled, and the like. The roofs 68 define the valve seats for the intake and exhaust valves 42, 44.

A fluid circuit 70 may also be provided in the engine 20 with fluid passages in the block 60 and/or the head 62 to provide a flow of fluid, such as coolant or lubricant, through the engine for cooling and/or lubrication. The fluid circuit may also include a reservoir, a pump 72, one or more heat exchangers such as a radiator or cabin heater, ventilation and air conditioning (HVAC) heater, valves, and other devices.

Figure 2:
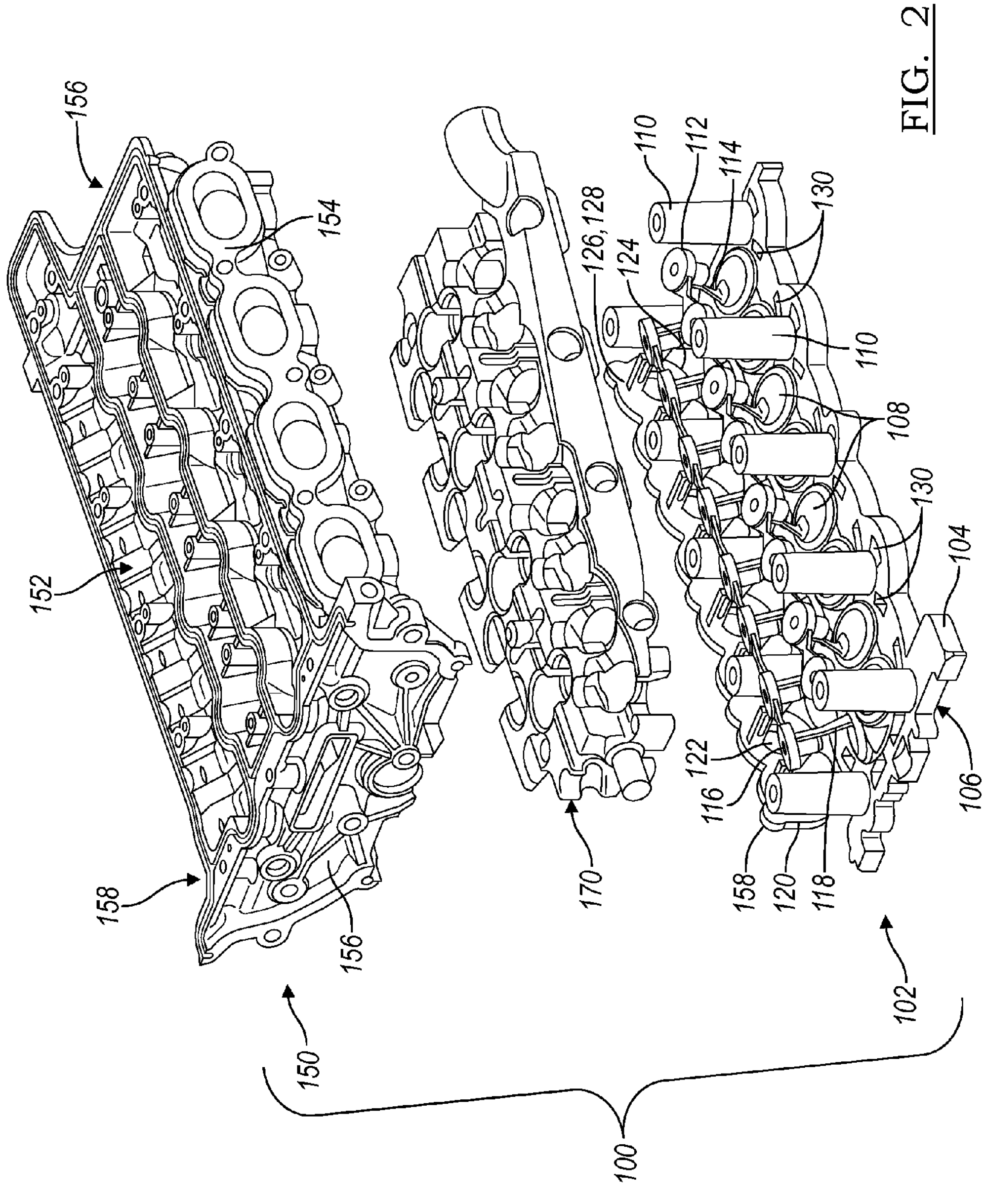
FIG. 2 illustrates an exploded view of the cylinder head of FIG. 1.

FIG. 2 illustrates an exploded schematic view of a cylinder head 100 according to an embodiment. The cylinder head 100 may be used as head 62 with the engine 20 according to an example. The head 100 is formed from multiple components or elements that are formed together to provide the structure of the head as described below. Although the head 100 is illustrated as being exploded, in reality, the structure would not be able to be disassembled in this manner after forming. At least some of the components or elements may be made from a composite material to provide a "composite" head. The composite material may include up to 50% carbon fiber reinforced thermal set composite resin, with the resin being ester based or polyester based. In other examples, other fiber, particle, or materials may be used in conjunction with the resin. The composite material may have a uniform composition, or may be made with a non-uniform composition. The cylinder head 100 is illustrated for use with an in-line, four cylinder engine, although other configurations are also contemplated.

In further examples, as described below, the engine cylinder head may be cast from aluminum, an aluminum alloy, or another metal. In another example, the engine cylinder head may be cast or molded from a composite material, including a fiber reinforced resin, and other suitable materials. Additional non-limiting examples of composite materials and an associated process include: a polyester/vinyl ester mixed thermal set resin with carbon fiber in a long fiber filler used in a vacuum assisted compression molding process, a compression set charge thermal set vinyl ester with carbon fiber in a long and short fiber filled mixture used in a vacuum assisted compression molding process, a phenolic carbon fiber filled reinforced thermal set composite material used in an injection molding process, a bio-fiber filled vinyl esters thermal set composite material used in a blow molding process, and a glass filled polyester/nylon composite material used in an injection molding process. The disclosure is not limited to the composite materials and forming processes included herein, and additional materials and processes may be used according to the spirit and scope of the disclosure.

The head 100 is formed as an integral final piece that requires minimal post-processing, such as machining, particularly for fluid passages or for valve guides. The head 100 has an inner member 102 and an outer member 150.

The inner member 102 provides the structural support for the head 100. The inner member 102 may be formed from a metal, such as aluminum, an aluminum alloy, a ferrous alloy, or the like. The member 102 may be a single integral component in one example.

The member 102 has a plate 104 that provides at least a portion of the deck face 106 of the cylinder head 100. The plate 104 and deck face form a series of dished cylinder roofs 108, which are more clearly illustrated in FIGS. 3-4. The dished cylinder roofs 108 provide the intake and exhaust ports for each cylinder and combustion chamber.

The inner member 102 also has a series of head bolt columns 110 that extend away from the plate 104. The head bolt columns 110 define a threaded bore, unthreaded bore, or the like that the head bolts extend through and cooperate with the block to assemble the engine. In the present example, the head bolts columns 110 are generally cylindrical, and are connected to the plate 104 along the length of the plate 104 and on both sides of the cylinder roofs 108. In other example, the head bolts columns 110 may have other shapes, and may be arranged as symmetric pairs or asymmetrically.

The inner member 102 also has intake valve guides 112 that are connected to the plate 104 by support arms 114. The intake valve guides 112 support and align the valve body of the intake valves.

The inner member 102 has exhaust valve guides 116 that are connected to the plate 104 by support arms 118. The exhaust valve guides support and align the valve body of the exhaust valves, and thermally protect the valve body from the high temperatures exhaust gases.

A plate 120 is connected to the plate 104 and forms part of the inner member 102. The plate 120 has a mounting face that is configured to mount with an exhaust manifold for the engine. The plate is therefore positioned on the exhaust side face of the block, and may form at least a portion of the exhaust side face. The plate 120 forms a series of apertures 122 through which the exhaust gases flow to the manifold. The plate 120 may be connected at an angle relative to the plate 104, for example, plate 120 may be substantially perpendicular to the plate 104. The plate 120 may be connected to the plate 104 along a first, bottom edge 124.

The plate 120 may be connected along a second, opposed, upper edge 126 to another structure such as the exhaust valve guides 116 using a bridge member 128. In other examples, the bridge member 128 may connect the plate 120 to the head bolt columns 110, or may connect the valve guides 116 to the head bolt columns 110. By tying the exhaust valve guides 116 and the plate 120 together using the additional structure of the bridge members 128, the strength of the head 100 may be increased, and distortions due to bending forces and moments, torsional forces and moments, and thermal distortions may be decreased.

The plate 104 may have apertures 130 formed that extend across the plate 104 to allow fluid flow therethrough. For example, the apertures 130 may provide for coolant flow into the head 100 from a corresponding cooling jacket in the block. The apertures 130 may also provide for lubrication or oil drain passages back to the block and reservoir.

The head 100 also has an outer member 150. The outer member 150 may be formed from a second, different material than the inner structural member 102, and in a further example, is formed from a composite material as described above. The outer member 150 is formed as an integral piece about the inner member 102, for example, in a molding process.

The outer member 150 forms the top face 152 or upper face or wall of the head 100, the intake side face 154 or intake side wall of the head, and first and second end faces 156 or end walls of the head. The outer member 150 may form a portion of the deck face 106 in conjunction with the inner member 102. The outer member 150 may also form a portion of the exhaust side face 158 or exhaust side wall in conjunction with the plate 120 of the inner member 102. The top face 152 is generally opposed to the deck face 106, and may require a cover or additional member for sealing the engine.

The outer member 150 defines the intake and exhaust passages and ports for the head 100. The intake and exhaust passages and ports may have walls that are formed by the material of the outer member 150, such that the outer member structure, e.g. the composite material, is in direct contact with the intake and/or exhaust gases. In other examples, one or both of the intake and exhaust passages and ports may have walls that are lined with a metal, such that the metal liner in positioned between the outer member structure, e.g. the composite material, and the intake and/or exhaust gases. The metal may be aluminum or an aluminum alloy.

The outer member 150 defines various fluid jackets. The outer member 150 may provide a single internal cooling jacket, or may provide for an upper and lower cooling jacket, etc. The outer member 150 defines the fluid passages for the fluid jackets, and may also provide at least some of the inlets and outlets to the jackets. The outer member 150 may also include a lubrication jacket or passages for a lubrication system.

The cooling jacket defined by the outer member 150 is formed by fluid passages. These fluid passages have a metal wall or metal lining that is positioned between the open void provided by the passage itself, and the composite structure of the outer member 150. The metal may be aluminum or an aluminum alloy.

The passages for the head 100 may be formed in the outer member 150 by one or more inserts, including lost core inserts, during the manufacturing process as described below. Insert 170 is illustrated as the insert to form fluid passages in a cooling jacket for the head 100. The insert 170 is formed before use with the tool to form the head. The insert 170 includes a lost core region 172. The lost core 172 may be a salt core, a sand core, a glass core, a foam core, or another lost core material as appropriate. A shell 174 surrounds or encapsulates the lost core 172 such that it covers at least a portion of the outer surface of the lost core 172. The shell 174 may be formed from a metal, including aluminum or an aluminum alloy. The core 172 is provided generally in the desired shape and size of a portion of fluid passage, or substantially all of a passage. In the example shown, the lost core 172 forms the shape of a cooling passage for the cooling jacket in the head 100. In other examples, the insert 170 and lost core 172 is provided with a shape and size to form other internal passages in the outer member 150, including intake and/or exhaust passages. In one example, one insert 170 provides the cooling jacket within the head 100. In other examples, multiple inserts 170 cooperate to form passages, e.g. intake and exhaust passages, in the head.

The insert 170 may include various contact points, contact surfaces, and lands that provide direct contact between the aluminum shell 174 and the plate 120. The direct contact between the two metal components provides for a heat transfer pathway to the coolant in the passages formed by the insert, and improves the cooling of the engine component. The contact points between the insert 170 and the plate 120 may be placed in strategic locations, e.g. in high heat flux areas due to natural combustion event heat gain such that conductive heat can be manage in and along these conduits of contact points or lands. For example, the aluminum shell 174 and the plate may be in direct contact with one another along an upper surface of the plate 120 and in the region of the combustion chamber wall. The direct contact provides a conduction pathway to transfer heat away from the head. In one example, as shown below in FIG. 4, a direct heat transfer, conduction pathway is provided through the combustion chamber 108 upper wall to the shell 174 and to coolant within a fluid passage. The contact points between the aluminum shell 174 and the plate 120 are maintained throughout the life of the component based on the surrounding outer member 150, e.g. a composite overmolded structure.

Some of the passages in the outer member 150 of the head 100 may be formed using a die structure on the tool, or may be formed using a lost material insert, or insert made from a lost core material without a metal shell, e.g. the intake passages with lower temperature gases and reduced erosion issues.

As the engine operates, the translational motion of the pistons within the cylinders is transformed into a rotational motion of a crankshaft. As the engine operates, the head bolts and main crankshaft bearing bolts are loaded due to forces on the engine caused by combustion within the cylinders, and their corresponding reactive loads or forces. These forces may cause significant stress and fatigue on the engine and on the engine head. The inner member 102 provides additional structural strength to the head by directly connecting the head bolt column of the head to that of the block, such that composite material or the material of the outer member 150 is not directly in the load path. As engine design moves towards weight reduction, the engine head may be made from alternative materials such as an aluminum alloy, a composite material, and the like. The insert 102 may be made from a different material from the head, e.g. an iron or aluminum alloy, to provide the desired strength for the head and engine and act as the primary load carrying structure within the head for the head bolts, while being sized for the limited packaging space.

Figure 3:
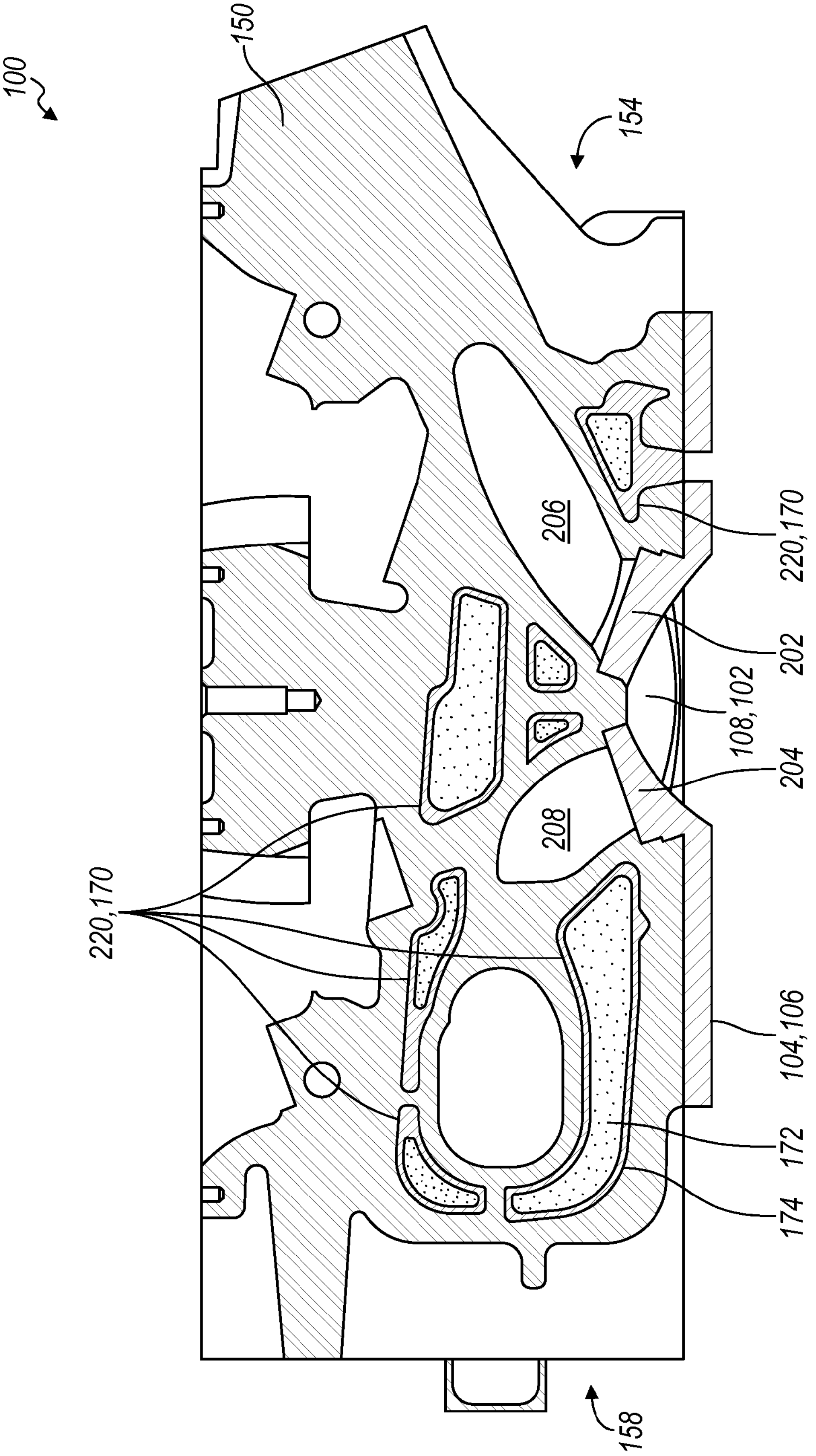
FIG. 3 illustrates a partial sectional view of a cylinder head according to an embodiment.

FIG. 3 illustrates a partial sectional view of the cylinder head 100. The structural insert 102 is illustrated as having a plate 104 providing the deck face 106. The plate 104 defines a dished region as the cylinder roof 108, which also defines an intake valve seat or aperture 202 and an exhaust valve seat or aperture 204.

The outer member 150 forms an intake port 206 or passage that is fluidly connected to and provides intake gases, e.g. air, to the intake aperture 202. The intake port 206 is illustrated as not having a lost core material, and in one example, the lost core material has already been removed from the head 100.

The outer member 150 forms an exhaust port 208 or passage that is fluidly connected to and receives exhaust gases from the exhaust aperture 204. The exhaust port 208 is illustrated as not having a lost core material, and in one example, the lost core material has already been removed from the head 100. The exhaust port 208 is illustrated as having walls formed by the material of the outer structure, e.g. a composite material. In another example, the exhaust port 208 may be lined with a metal wall, as described below and shown with respect to the cooling jacket.

A cooling jacket 220 is formed within the head 100 by the outer member 150. The cooling jacket 220 is formed by a series of interconnected fluid passages that direct coolant to various regions of the head for thermal management of the head 100. The cooling jacket 220 is formed by the insert 170. The lost core material 172 is illustrated within the outer member 150, as it has not yet been removed from the head 100 in a post-forming step. The lost core material 172 is surrounding or encapsulated by the thin-walled metal shell 174. The thin-walled metal shell 174 may be on the order of millimeters in thickness. The shell 174 remains in the outer member 150 after the lost core material 172 is removed from the head 100, such that the shell 174 lines the passages of the cooling jacket 220.

The shell 174 is provided as a barrier between fluids in the jacket 220 and the material of the outer member 150. An outer member made from a composite material, e.g. a carbon fiber resin composite, has a degree of porosity due to the fibers, as well as any voids or imperfections formed during the molding process. As such, the shell 174 acts as a liner to prevent leakage or fluid transport into the outer member 150.

The shell 174 also acts to enhance heat transfer between the head 100 and the fluids in the cooling jacket 220. An outer member made from a composite material, e.g. a carbon fiber resin composite, has a much lower thermal conductivity than the metal shell. As such, the shell 174 acts as a thermal conduit and enhances heat transfer to the fluid to more effectively and efficiently cool the head 100 during operation. In a further example, the outer shell 174 may be provided with various surface features on the inner wall in contact with the fluid, or on the outer wall in contact with the outer member 150 to enhance head transfer by increasing the surface area and/or creating desired flow patterns, e.g. fins, vortex or swirl inducing features, various surface roughnesses, and the like.

Figure 4:
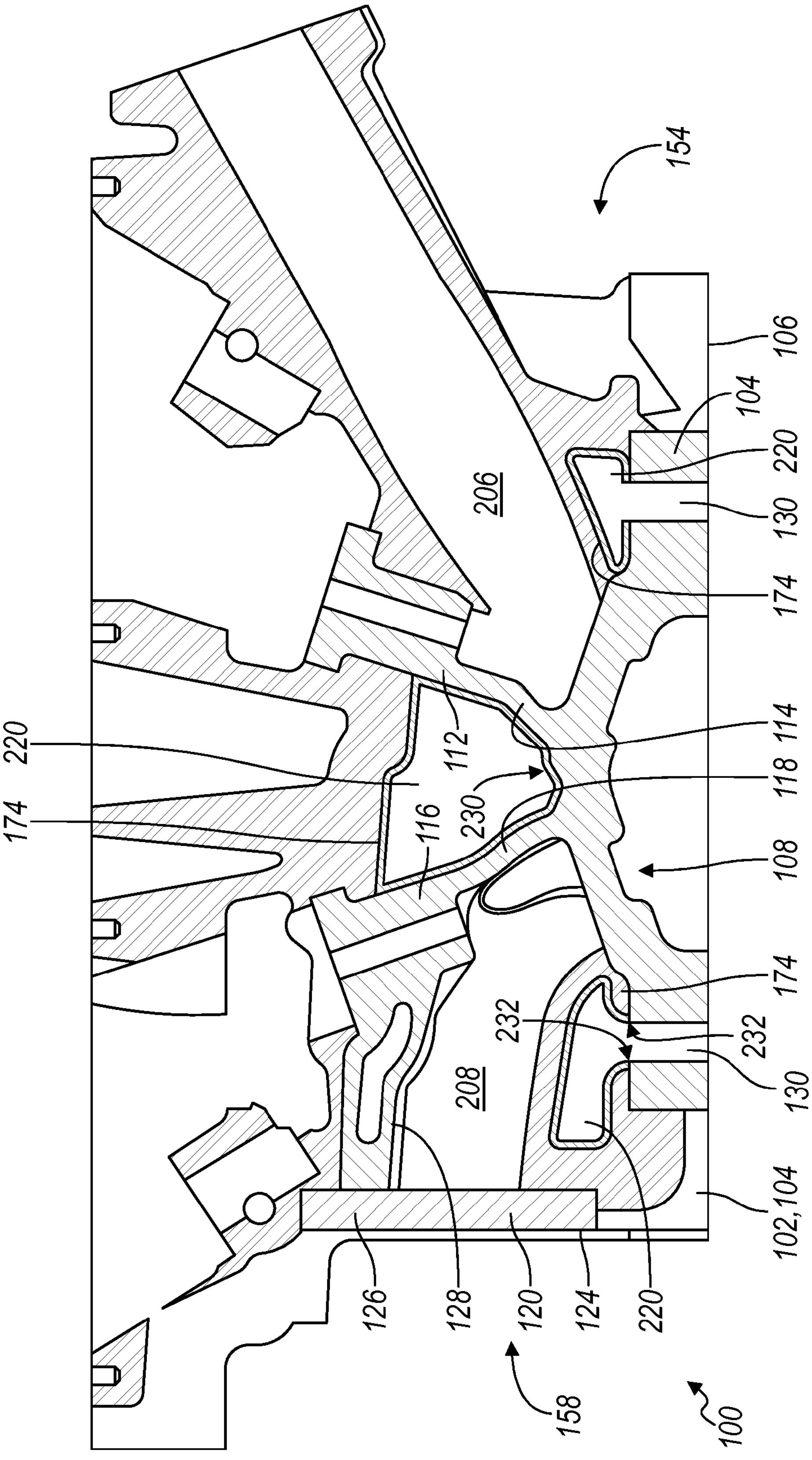
FIG. 4 illustrates another sectional view of the cylinder head of FIG. 2.

FIG. 4 illustrates another cross-sectional view of the head 100, taken along a different part line. The intake guide 112 for the intake valve is connected to the plate 104 and the dished cylinder roof 108 by a support arm 114, and forms part of the structural insert 102. The exhaust guide 116 for the exhaust valve is connected to the plate 104 and the dished cylinder roof 108 by a support arm 118, and forms part of the structural insert 102.

As can be seen in FIG. 4, the shell 174 is in direct contact at 230 with at least a portion of the insert 102, for example, in contact with the cylinder roof 108 between the valve guides 112, 116 to provide for a heat transfer pathway from the combustion chamber to coolant in the jacket 220. The shell 174 is also in direct contact at 232 with the upper surface of the plate 104 adjacent to the apertures 130 to provide enhanced heat transfer and a conduction pathway from the deck face to the coolant. The shell 174 and the insert 102 may also be in direct contact with one another in other locations in the head 100 based on positioning and heat transfer/cooling requirements.

The plate 120 is illustrated as being connected to the plate 104 along a lower edge or region 124. The plate 120 is also connected to exhaust guide 116 by a bridge member 128. The bridge member 128 may include a passage that forms a part of the cooling jacket 220 to cool the head in the region of the exhaust port 208. In other examples, the bridge member 128 may be a solid structure without fluid passages.

The head 100 is illustrated with the lost core materials removed from the cooling jacket 220. As can be seen in the Figure, the shell 174 acts as a liner or wall for the fluid passages of the jacket 220 and is in contact with the material of the outer member 150. Fluid, such as coolant, may flow into or out of the head cooling jacket 220 to an engine block via apertures 130 in the plate 104. The fluid jacket 220 may also have other fluid inlets and/or outlets provided on other faces of the head 100.

Figure 5:
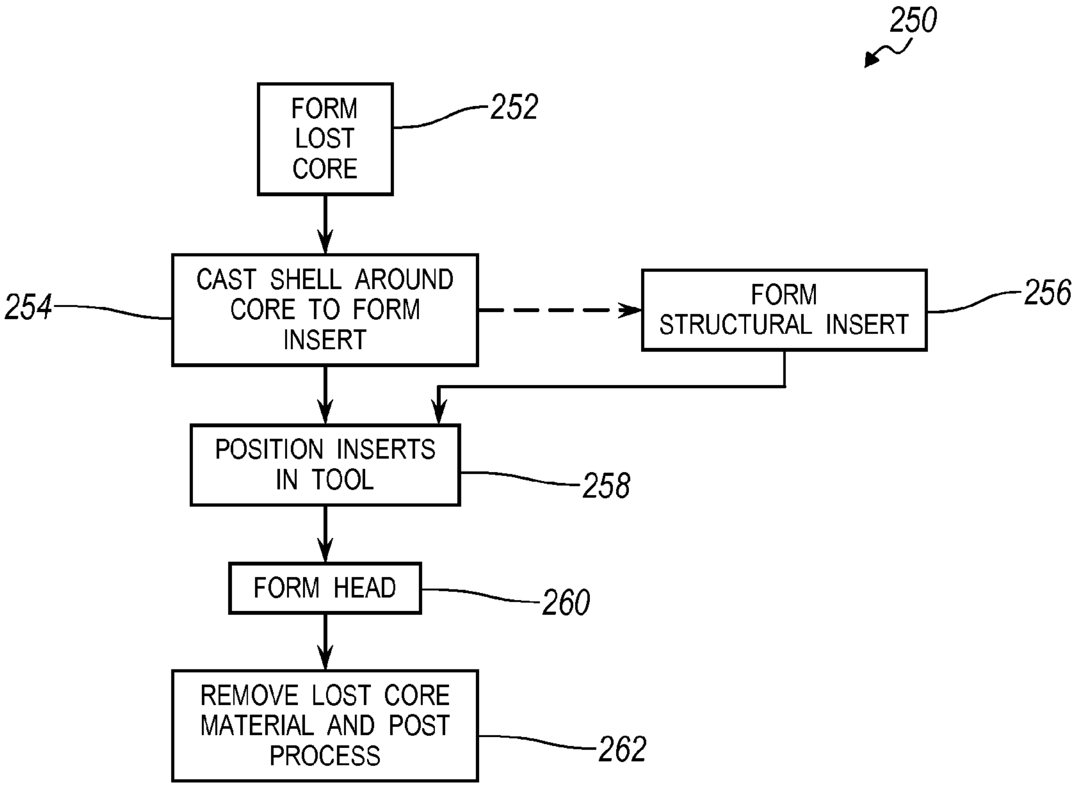
FIG. 5 illustrates a flow chart of a method of forming the cylinder head of FIG. 2.

FIG. 5 illustrates a process or a method 250 for forming a head for an engine, such as head 100. Various embodiments of the method 250 may include greater or fewer steps, and the steps may be performed in another order than illustrated.

At step 252, the lost core insert 170 is formed before use with the tool to form the head 100. To form the insert, the lost core 172 is formed in the desired shape and size, for example, a casting or molding process with the lost core material.

At step 254, the shell 174 is then provided around the core 172. In one example, a die casting or casting process is used to form the shell 174 while maintaining the integrity of the core 172. A die, mold, or tool may be provided with the shape of the insert 170. The core 172 is positioned within the die, and the shell 174 is cast or otherwise formed around the core 172. The shell 174 may be formed by a low pressure casting process by injecting molten metal or another material into the mold. The molten metal may be injected at a low pressure between 2-10 psi, 2-5 psi, using a gravity feed, or another similar low pressure range. The material used to form the shell 174 may be aluminum or an aluminum alloy, and if the outer member 150 is formed from a metal material, may be the same metal or metal alloy as used to die cast the head. By providing the molten metal at a low pressure, the lost core 172 is retained within the shell 174. After the shell 174 cools, the insert 170 is ejected from the tool.

At step 256, the structural insert 102 is formed. In one example, the structural insert 102 is cast or otherwise formed using a metal or metal alloy by injecting molten metal into a tool. The tool has various surfaces to shape and define the features of the insert 102. In the present example, the structural insert is formed using a high pressure die casting process. The molten metal may be aluminum, an aluminum alloy, or another suitable material. The molten metal is injected at a high pressure, i.e. 20,000 psi, to form the engine component. The molten metal may be injected at a pressure greater than or less than 20,000 psi, for example, in the range of 15000-30000 psi, and may be based on the metal or metal alloy in use, the shape of the mold cavity, and other considerations. In another example, the structural insert 102 is formed from iron, a ferrous alloy, or the like in a casting or forging process.

In other examples, the insert 102 is formed from another suitable material with a greater strength than the head outer member 150 material. The insert 102 may be cast using a near net shape casting process, and may be cast using a high pressure or low pressure process. The insert is formed with the surface features and tribology features as described above, and in further examples, additional surface features may be provided by a machining process or the like. In other examples, the insert 102 may be formed using other appropriate manufacturing techniques, including, but not limited to, casting, powder metallurgy techniques, forging, machining, die casting and heat treating, etc. The insert 102 may be coated before being placed in the tool to provide an improved bond with the material of the outer member 150 of the head 100.

In one example, steps 254 and 256 are completed separately, with the lost core insert 170 and the structural insert 102 provided as separate stand-alone components to the tool for forming the head. In another example, the lost core insert 170 is provided as an insert or component within the tool for forming the structural insert 102, and a resulting combination insert including the features of both the lost core insert 170 and the structural insert 102 is provided to the tool for forming the head. This may be appropriate for example, when the bridge member 128 includes a passage of the cooling jacket.

At step 258, the lost core insert and structural insert are positioned within a tool for forming the head, or alternatively, a combination insert is positioned within a tool for forming the head. In either case, the insert 170 has contact points, surfaces, and lands that cooperate and mate with surfaces of the structural insert 102 that provide both positioning of the inserts relative to one another, and direct contact for heat transfer pathways between the structural insert 102 and the shell 174 of the insert 170 during component use. The insert(s) may have various locating features that cooperate with the dies of the tool to position and align the insert(s) within the tool. Other additional inserts may also be provided and arranged within the tool, for example, lost core inserts for forming the intake or exhaust passages, lubrication passages, and the like. These inserts may be formed from a lost core material alone, or may have a lost core material encapsulated by a metal shell as described herein.

At step 260, the head 100 is formed by injecting material into the tool for forming the head. The tool may include multiple dies or slides, including cover dies and ejector dies that cooperate to form a mold cavity with surfaces shaped to form various features of the head 100.

In one example, a composite mixture is injected into the tool to form the outer member 150 about the inserts 102, 170 and form the head 100. The outer member 150 may be formed around the inserts 102, 170 using a molding technique such as injection molding, etc. The tool is provided according to the manufacturing technique for the head 100, and may include various dies, molds, slides, and the like. The tool may also include various inserts or cores to provide other features of the head. The composite material flows around and forms an interface and/or bond with the shell 174 of the insert 170. During the molding process, the head may self-cure via a thermal set process, or an autoclave or the like may be used to cure the composite material. The molding process can be of an injection mold or compression mold both being thermal set at time of production. The head 100 is then removed from the tool as an unfinished component or preform.

In another example, a molten metal is injected into the tool to form the outer member 150 about the inserts 102, 170 and form the head 100. In the present example, the process may be a high pressure die casting process with aluminum or an aluminum alloy forming the material of the outer member 150. The structural insert 102 may be formed from a ferrous alloy, or may be aluminum or another aluminum alloy. The molten metal flows around the inserts 102, 170, and forms a casting skin around the inserts. The shell 174 of the lost core insert 170 may be partially melted to meld with the injected metal and integrate with the outer member 150. The casting skin and shell form the walls of the fluid jacket 220 in the head. Without the shell 174, the injected molten metal would disintegrate the lost core 172. The molten metal cools to form the outer member 150 and the head 100. The head 100 is then removed from the tool as an unfinished component or preform.

By providing the shell 174, the lost core 172 remains intact for later processing to form the passages in the fluid jacket 220. The shell 174 allows for smaller dimensioned passages, and the use of surface features that would otherwise be unavailable with a high pressure forming process, as the lost core material may not retain its shape during the process. For example, the lost core insert 170 may provide for passages or features within the cooling jacket 220 on the order of millimeters, with passages being less than 10 mm, 5 mm, or 2 mm in size, and surface features on the order of 1 mm in resolution. Conventional lost material casting or sand casting is unable to resolve surface features or passages with these dimensions for a high pressure forming process, as the lost core material at this scale may be destroyed.

At step 262, the unfinished head component is post-processed. The lost core material 172 of the insert 170 remains in the head 100, as shown in FIG. 3, and needs to be removed. In one example, the lost core 172 is removed from the head to form the passages in the jacket 220. The lost core 172 may be removed using pressurized fluid, such as a high pressure water jet. In other examples, the lost core 172 may be removed using other techniques as are known in the art. The lost core 172 is called a lost core in the present disclosure based on the ability to remove the core in a post die casting or post molding process. The lost core in the present disclosure remains intact during the die casting or molding process due to the shell 174 surrounding and protecting it.

Other post-processing machining or manufacturing steps may also be conducted. For example, the deck face 106 may be milled or machined. Additional passages or ports may be provided by additional finishing or machining after molding or casting in some embodiments. Additionally, the head 100 may be machined, or drilled and tapped. For example, the head bolt columns 110 may need to be drilled and/or tapped.

After the head 100 has been post-processed, the engine 20 may be assembled by connecting the cylinder head to the block, and the engine 20 may be placed into a vehicle.

Various embodiments of the present disclosure have associated, non-limiting advantages. For example, for a block formed at least in part from a composite material, and thermal gradient hot spots need special heat management as the composite material acts as an insulator due to its low thermal conductivity. A self-contained hollow aluminum core that nests in contact with a high heat source for example the composite cylinder head provides for a fluid jacket with heat management of the head. The coolant is used to extract heat from the engine cylinder head out to the heat exchanger, e.g. a radiator. The fluid flow passage is contained in the hollow aluminum core molded or cast into the surrounding housing such as a composite over-molded cylinder block. The skin of the outer surface of the fluid flow passage is in direct contact with the composite material and/or aluminum alloy die cast holding it. The passage provides a heat flux conduit that pulls excess heat from such areas requiring dimensional stability, with the outer surface or shell being made from aluminum or an aluminum alloy material, which dissipates and conducts heat efficiently. The cooling jacket insert with an aluminum shell over the salt core provides a structure to protect the salt core from fracturing or otherwise dissolving during the manufacturing process. The resulting coolant circuit or cooling jacket in the head has thin walls and smaller cross sectional passageways. The cooling jacket insert allows for tight positional control, and also control over the physical shape of the fluid passages for optimized heat transfer due to improved flow circuit configurations that are otherwise unavailable with conventional sand cores or high pressure casting or molding tooling limitations. The thin cross sections of the fluid passages allow coolant to be placed next to the high heat flux regions like valve seats in the head. A structural insert is used with the head to provide additional strength to the head, for example, when used with a composite material, and results in an engine with reduced weight and increased fuel efficiency.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A cylinder head for an internal combustion engine comprising:

an inner structural metal member having a first plate forming a deck face of the cylinder head and forming a series of dished cylinder roofs, the inner structural member having cylinder head bolt columns extending from the first plate, exhaust valve guides connected to the first plate by first support arms, intake valve guides connected to the first plate by second support arms, and a second plate configured for mounting an exhaust manifold and extending at an angle to the first plate; and an outer composite member supported by and surrounding the inner structural member and forming a body of the cylinder head including an intake side wall, first and second end walls, and a top wall opposed to the deck face, the outer composite member defining a cooling jacket, intake ports, and exhaust ports, the outer composite member encapsulating the cylinder head bolts columns and the intake and exhaust valve guides of the inner structural member;

wherein fluid passages of the cooling jacket defined by the outer composite member are lined with metal walls in contact with and encapsulated by the composite material of the outer composite member.

2. The cylinder head of claim 1 wherein the exhaust ports are formed by metal walls in contact with and surrounded by the composite material of the outer composite member.

3. The cylinder head of claim 1 wherein the inner structural member is formed by a single, integral component.

4. The cylinder head of claim 3 wherein the inner structural member has bridge members, each bridge member extending from the second plate to one of the exhaust valve guides.

5. The cylinder head of claim 1 wherein the metal walls lining the fluid passages defined by the outer composite member and the inner structural member are in direct contact with one another via contact points.

6. The cylinder head of claim 5 wherein one of the contact points is at one of the dished cylinder roofs between associated intake and exhaust valve guides.

7. A cylinder head comprising: an inner structural member having a first plate forming a deck face of the cylinder head and forming at least one dished cylinder roof, a second plate extending at an angle to the first plate and configured for mounting an exhaust manifold, a plurality of cylinder head bolt columns extending from the first plate, an intake valve guide connected to the first plate by a support arm, and an exhaust valve guide connected to the first plate by another support arm; and an outer composite member supported by and surrounding the inner structural member and forming intake ports, exhaust ports, and a cooling jacket with fluid passages having a metal lining encapsulated by the outer composite member, the outer composite member encapsulating the cylinder head bolt columns, the intake valve guide, and the exhaust valve guide of the inner structural member.

8. The cylinder head of claim 7 wherein the inner structural member comprises metal.

9. The cylinder head of claim 8 wherein the composite material comprises carbon fiber.

10. The cylinder head of claim 7 wherein the outer composite member forms an intake side face, a first and second end face, and a top face of the head.

11. The cylinder head of claim 7 wherein the inner structural member is formed by a single, integral component.

12. The cylinder head of claim 7 wherein the outer composite member is overmolded onto the inner structural member.

* * * * *